United States Patent
Sakai et al.

(10) Patent No.: US 7,059,190 B2
(45) Date of Patent: Jun. 13, 2006

(54) SEMICONDUCTOR DYNAMIC SENSOR HAVING VARIABLE CAPACITOR FORMED ON LAMINATED SUBSTRATE

(75) Inventors: Minekazu Sakai, Kariya (JP); Tameharu Ohta, Takahama (JP)

(73) Assignee: Denso Corporation, Kariya (JP)

( * ) Notice: Subject to any disclaimer, the term of this patent is extended or adjusted under 35 U.S.C. 154(b) by 2 days.

(21) Appl. No.: 10/926,147

(22) Filed: Aug. 26, 2004

(65) Prior Publication Data

US 2005/0076714 A1    Apr. 14, 2005

(30) Foreign Application Priority Data

Oct. 8, 2003  (JP)  ............................. 2003-349473
Oct. 8, 2003  (JP)  ............................. 2003-349474

(51) Int. Cl.
*G01P 15/125* (2006.01)
(52) U.S. Cl. ................. 73/514.32; 361/280; 73/504.12
(58) Field of Classification Search ............. 73/514.32, 73/514.29, 504.02, 504.04, 504.12, 514.18, 73/514.21, 514.36, 504.14; 361/280, 283.3
See application file for complete search history.

(56) References Cited

U.S. PATENT DOCUMENTS

| 5,146,389 A | 9/1992 | Ristic et al. |
| 6,308,569 B1 * | 10/2001 | Stewart .................... 73/514.32 |
| 6,955,086 B1 * | 10/2005 | Yoshikawa et al. ...... 73/514.32 |

FOREIGN PATENT DOCUMENTS

JP  A-9-113534  5/1997

* cited by examiner

*Primary Examiner*—Helen Kwok
(74) *Attorney, Agent, or Firm*—Posz Law Group, PLC

(57) ABSTRACT

An acceleration sensor is formed on a top surface of a laminated silicon-on-insulator substrate. The acceleration sensor is composed of first and second capacitors each including a movable electrode that moves according to acceleration imposed thereon. The first and the second capacitors are so made that their capacitances change differently when the same acceleration is imposed and that the capacitance difference represents an amount of acceleration imposed thereon. A third capacitor having an output electrode solidly connected to the base substrate via the insulation layer is also formed on the same silicon-on-insulator substrate. An output representing amount of acceleration is taken out from the output electrode of the third capacitor.

13 Claims, 18 Drawing Sheets

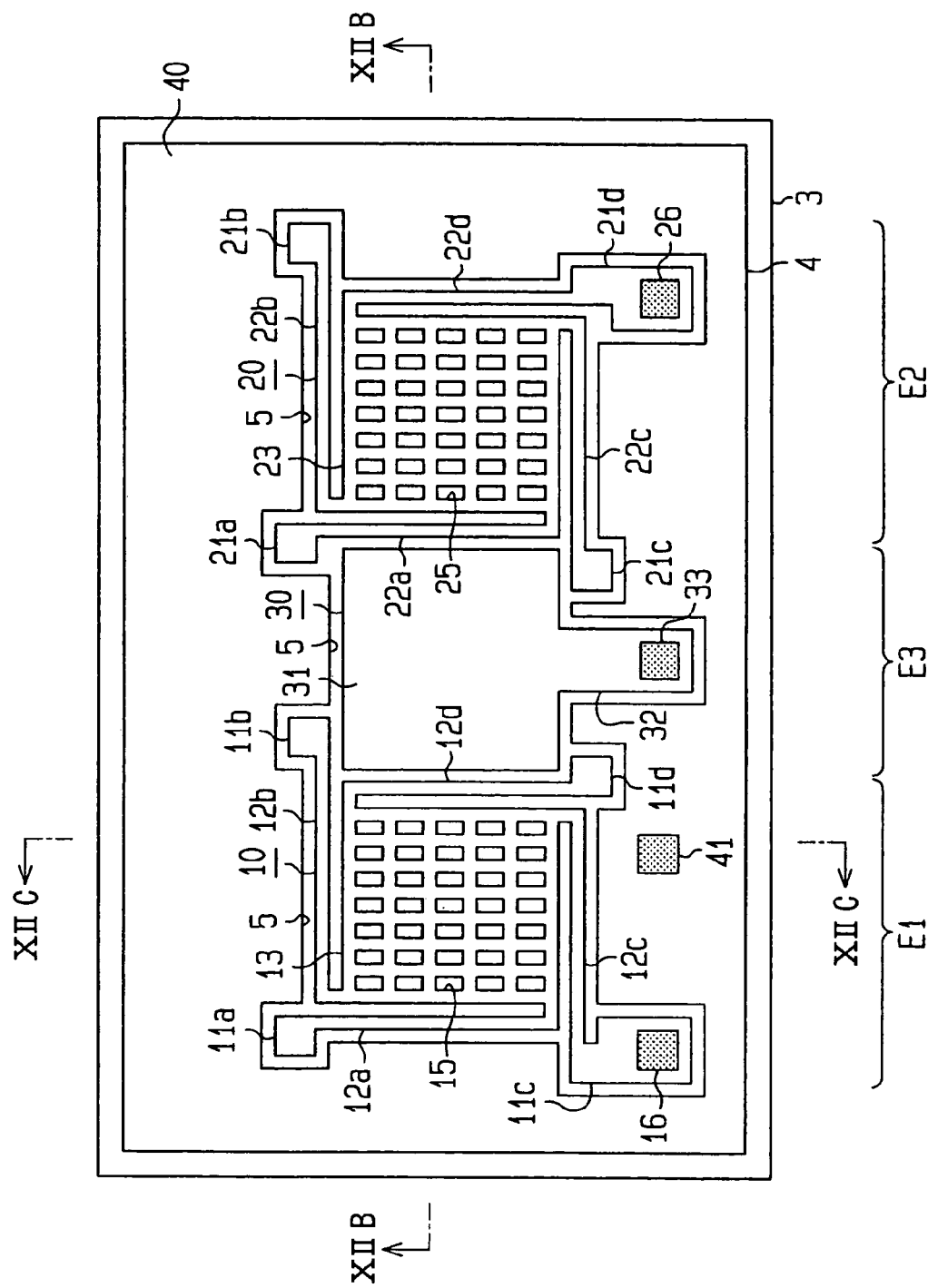

SEMICONDUCTOR DYNAMIC SENSOR HAVING VARIABLE CAPACITOR FORMED ON LAMINATED SUBSTRATE

CROSS-REFERENCE TO RELATED APPLICATIONS

This application is based upon and claims benefit of priority of Japanese Patent Applications No. 2003-349473 filed on Oct. 8, 2003 and No. 2003-349474 filed on Oct. 8, 2003, the contents of which are incorporated herein by reference.

BACKGROUND OF THE INVENTION

1. Field of the Invention

The present invention relates to a semiconductor dynamic sensor such as an acceleration sensor for use in an automotive vehicle.

2. Description of Related Art

An example of an acceleration sensor formed on a silicon-on-insulator substrate (an SOI substrate) is disclosed in JP-A-9-113534. An essential portion of the acceleration sensor is shown in FIG. 22 attached hereto. A beam structure having a movable electrode 102 supported by four beams 101a, 101b, 101c and 101d is formed on an SOI substrate that includes a base substrate 100, an insulation layer and an upper semiconductor layer formed on the insulation layer. The four beams 101a–101d are supported on the insulation layer at each end thereof, and an air gap is formed between the movable electrode 102 and the base substrate 100.

When an accelerating force is imposed on the movable electrode 102, the movable electrode 102 moves in a direction (Z-direction shown in FIG. 22) perpendicular to the surface of the SOI substrate. A capacitance formed between the movable electrode 102 and the base substrate 100 varies according to an amount of acceleration imposed on the movable electrode 102. The amount of acceleration is detected based on an output representing the capacitance changes. The output is taken out from a terminal pad 100' formed on the base substrate 100. However, the output of the acceleration sensor of this type is easily disturbed by noises. In addition, the terminal pad 100' formed on the base substrate 100 has to be electrically connected to an outside circuit by wire-bonding.

Another example of an acceleration sensor is disclosed in JP-A-5-218300, the essence of which is shown in FIG. 23 attached hereto. The acceleration sensor is formed on a silicon substrate 110. On the silicon substrate 110, various layers and air gaps are formed in the following order: a first static conductor layer 111 (a poly-silicon layer), an air gap 112, a dynamic conductor layer 113 (a poly-silicon layer), another air gap 114, and a second static conductor layer 115 (a poly-silicon layer) . The first and the second static conductor layers 111, 115 are stationary, while the dynamic conductor layer 113 is movable in the direction perpendicular to the plane surface of the silicon substrate 110.

When an acceleration force is posed on the dynamic conductor layer 113, capacitances formed on both sides of the dynamic conductor layer 113 change according to the acceleration force. An amount of acceleration is detected based on an output signal representing capacitance difference between two capacitors. By using the capacitance difference between two capacitors, disturbing noises are canceled out in tow capacitors. However, it is not easy to manufacture this type of sensor because many layers have to be formed on the silicon substrate 110.

SUMMARY OF THE INVENTION

The present invention has been made in view of the above-mentioned problems, and an object of the present invention is to provide an improved semiconductor dynamic sensor which is easily manufactured and has a high detection accuracy.

The present invention is advantageously applicable to an acceleration sensor mounted on an automobile for detecting an amount of acceleration. The acceleration sensor is formed on a silicon-on-insulator substrate (SOI substrate) composed of a base plate, an insulation layer and a thin semiconductor layer, laminated in this order. All the components forming the acceleration sensor, i.e., a first capacitor, a second capacitor and a third capacitor are formed on the thin semiconductor layer which is the upper most layer.

The first and the second capacitors have a similar structure. Each capacitor is composed of a beam structure having four beams anchored on the insulation layer and a movable electrode supported by the four beams and facing the base substrate forming an air gap therebetween. The movable electrode moves in a direction perpendicular to a plane of the SOI substrate when an acceleration force is applied to the movable electrode, and thereby a capacitance formed between the movable electrode and the base substrate varies according to an amount of the acceleration force. The beam structures of the first capacitor and the second capacitor are made somewhat differently from each other, so that the their capacitances change in a different manner when the same acceleration force is applied. For example, the beams are formed differently in their length or width, or the movable electrodes are made to have a different weight or plane area. In this manner, a capacitance difference appears between the first and the second capacitors when an acceleration is imposed on the acceleration sensor.

The third capacitor is composed of an output electrode solidly connected to the base substrate via the insulation layer. An output signal representing the capacitance difference that varies in accordance with an amount of acceleration appears on the base substrate. The output signal is transmitted to the output electrode of the third capacitor from the base substrate through the third capacitance.

Since the sensor output is obtained based on the capacitance difference between the first and the second capacitors, noises disturbing the sensor output are canceled out in the pair of capacitors. Since the output is taken out from the output electrode of the third capacitor, all the electrical connections are made on the top surface, i.e., on the thin semiconductor layer.

In place of the output electrode of the third capacitor, a frame portion surrounding the first and the second capacitors may be utilized as the output electrode from which the output is taken out. In this arrangement, the third capacitor can be eliminated. Alternatively, the second capacitor may be eliminated, and a constant voltage is applied to the frame portion to utilize the frame portion as a shield layer for alleviating noise disturbances. In this manner, the structure of the acceleration sensor is further simplified.

Other objects and features of the present invention will become more readily apparent from a better understanding of the preferred embodiments described below with reference to the following drawings.

BRIEF DESCRIPTION OF THE DRAWINGS

FIG. 12A is a plan view showing an acceleration sensor (similar to the first embodiment shown in FIG. 1) in which capacitors having different permittivity are formed;

DETAILED DESCRIPTION OF THE PREFERRED EMBODIMENTS

A first embodiment of the present invention will be described with reference to FIGS. 1–7. First, referring to FIGS. 1–4, a structure of an acceleration sensor to which the present invention is applied will be described. The acceleration sensor is used for detecting an amount of acceleration of an automotive vehicle. The acceleration sensor is formed on an silicon-on-insulator substrate 1 (referred to as an SOI substrate) that is composed of a base substrate 2 made of monocrystalline silicon, an insulation layer 3 made of silicon oxide (mostly $SiO_2$) and a thin semiconductor layer made of monocrystalline silicon. The base substrate 2, the insulation layer 3 and the thin semiconductor layer 4 are laminated in this order.

Figure 1:
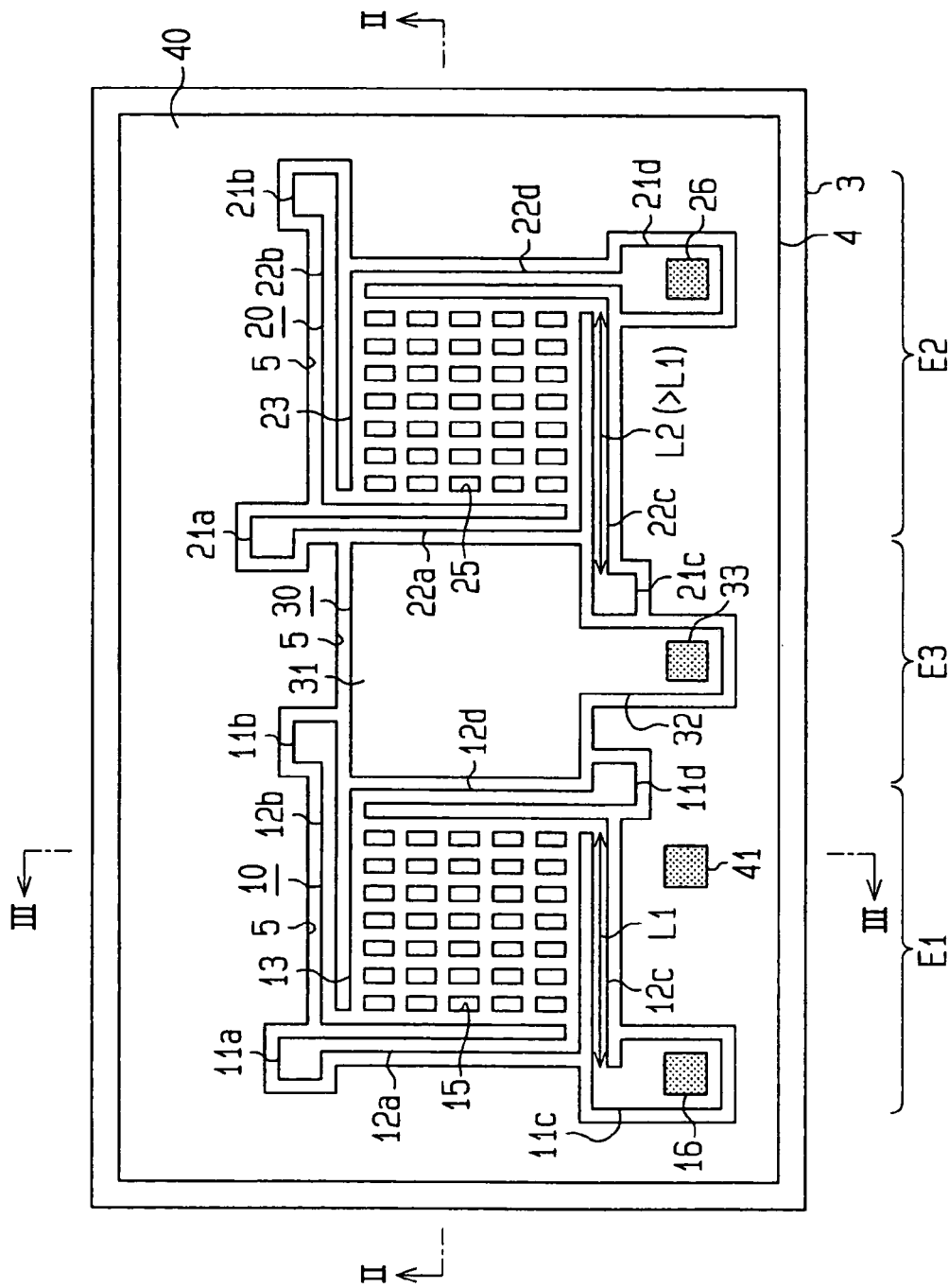
FIG. 1 is a plan view showing an acceleration sensor as a first embodiment of the present invention.
Figure 2:
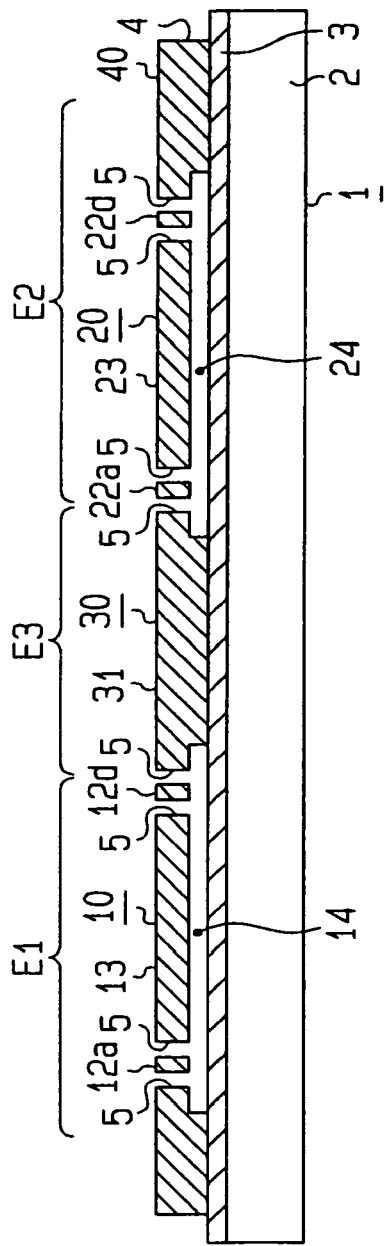
FIG. 2 is a cross-sectional view showing the acceleration sensor shown in FIG. 1, taken along line II—II in FIG. 1.

As shown in FIGS. 1 and 2, a first capacitor region E1, a second capacitor region E2 and a third capacitor region E3, constituting an acceleration sensor, are formed on the SOI substrate 1 as one chip. A through-ditch 5 is formed on the thin semiconductor layer 4 as shown in FIG. 1, and three regions E1, E2 and E3 are separated from one another by the through-ditch 5. A first beam structure 10 constituting a first capacitor having capacitance C1 is formed in the first region E1, a second beam structure 20 constituting a second capacitor having capacitance C2 is formed in the second region E2, and an output electrode 30 constituting a third capacitor having capacitance C3 is formed in the third region E3. These three regions E1, E2, E3 are also separated from a frame portion 40 by the through-ditch 5.

Figure 3:
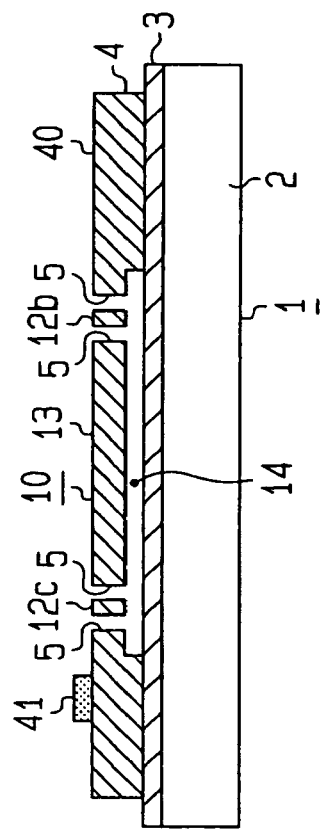
FIG. 3 is a cross-sectional view showing the acceleration sensor shown in FIG. 1, taken along line III—III in FIG. 1.
Figure 4:
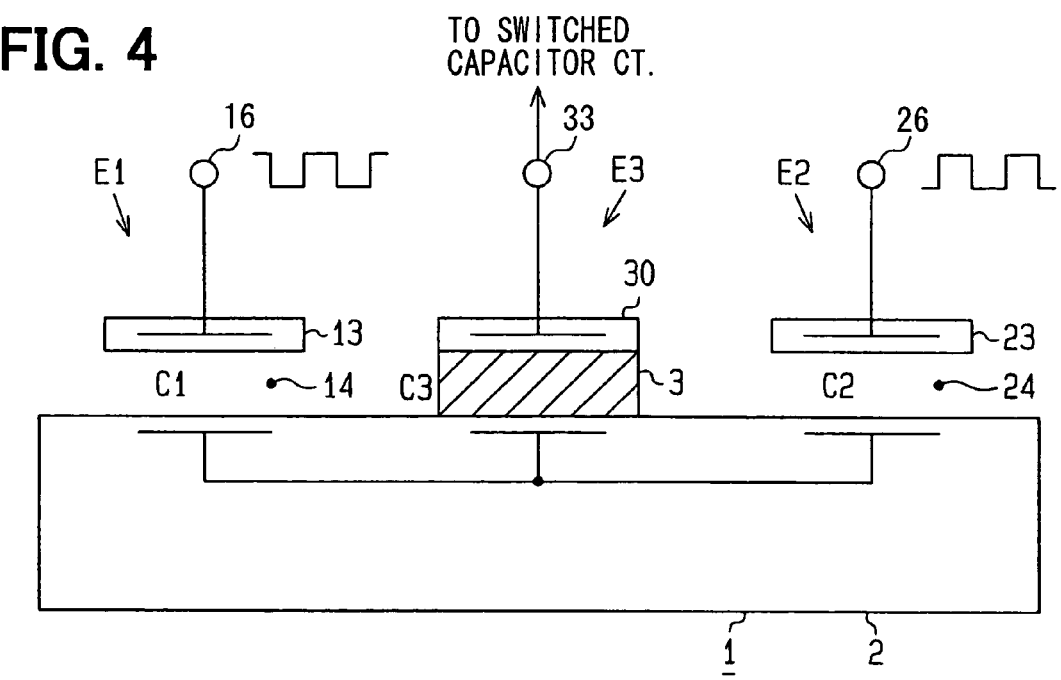
FIG. 4 is a schematic diagram showing an electrical structure in the acceleration sensor.

The first beam structure 10 is composed of four anchors 11a, 11b, 11c, 11d, four beams 12a, 12b, 12c, 12d, and a movable electrode 13 (a weight portion). The anchors 11a–11d are fixed on the insulation layer 3, and one end of each beam 12a–12d is connected to each anchor 11a–11d and the other portion of each beam faces the insulation layer 3 with an air gap 14 interposed therebetween, as shown in FIGS. 2 and 3. The movable electrode 13 is supported by the four beams 12a–12d and faces the insulation layer 3 with the air gap 14 interposed therebetween. Through-holes 15 are formed in the movable electrode 13 to thereby reduce the weight of the movable electrode 13. The movable electrode 13 and the base plate 2 form a first capacitor having capacitance C1, as shown in FIG. 4.

Similarly, the second beam structure 20 is composed of four anchors 21a, 21b, 21c, 21d, four beams 22a, 22b, 22c, 22d, and a movable electrode 23 (a weight portion). The anchors 21a–21d are fixed on the insulation layer 3, and one end of each beam 22a–22d is connected to each anchor 21a–21d and the other portion of each beam faces the insulation layer 3 with an air gap 24 interposed therebetween, as shown in FIGS. 2 and 3. The movable electrode 23 is supported by the four beams 22a–22d and faces the insulation layer 3 with the air gap 24 interposed therebetween. Through-holes 25 are formed in the movable electrode 23 to thereby reduce the weight of the movable electrode 23. The movable electrode 23 and the base plate 2 form a capacitor having capacitance C2, as shown in FIG. 4.

The movable electrodes 13, 23 move in the direction perpendicular to the plane surface of the SOI substrate 1 when acceleration force is imposed on the movable electrodes 13, 23. The beams 12a–12d and 22a–22d supporting the movable electrodes 13, 23 also function as springs for returning the movable electrodes 13, 23 to their initial positions when the acceleration force disappears. The length of each beam 12a–12d is L1, and the length of each beam 22a–22d is L2. The length L2 is made longer than the length L1, so that the movable electrode 23 moves more than the movable electrode 13 moves when an acceleration force is imposed thereon. Therefore, an amount of capacitance change in the capacitance C2 is larger than that in the capacitance C1 when the same acceleration is imposed on both movable electrodes 13, 23. As shown in FIG. 1, a terminal pad 16 made of aluminum is formed on the anchor 11c made of the thin semiconductor layer 4, and similarly a terminal pad 26 is formed on the anchor 21d.

The output electrode 30 formed in the third capacitor region E3 is composed of a square portion 31 and a portion 32 extending from the square portion 31. As shown in FIG. 2, the output electrode 30 is rigidly connected to the base substrate 2 via the insulation layer 3. A third capacitor having capacitance C3 is formed between the output electrode 30 and the base substrate 2. A terminal pad 33 made of aluminum is formed on the extending portion 32. As shown in FIG. 4, a signal corresponding to a capacitance difference between the first capacitor and the second capacitor, i.e., (C1−C2), is taken out from the terminal pad 33.

On the frame portion 40 separated from the three regions E1, E2, E3 by the through-ditch 5 and surrounding those regions, a terminal pad 41 made of aluminum is formed. The thin semiconductor layer 4 constituting the frame portion 40 is maintained at a constant potential by supplying a constant voltage to the terminal pad 41. Thus, the first and the second beam structures 10, 20 and the output electrode 30 are electromagnetically shielded.

Figure 5A:
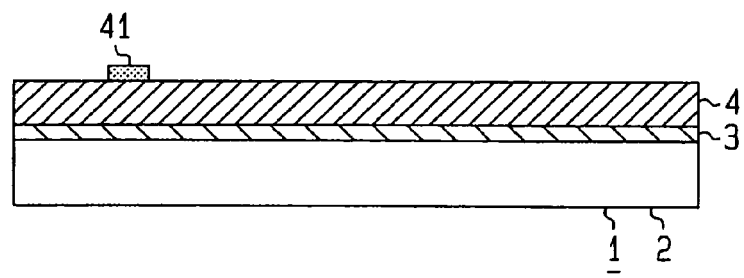
FIGS. 5A–5C are cross-sectional views showing a process of manufacturing the acceleration sensor shown in FIG. 1, taken along line III—III in FIG. 1.
Figure 5B:
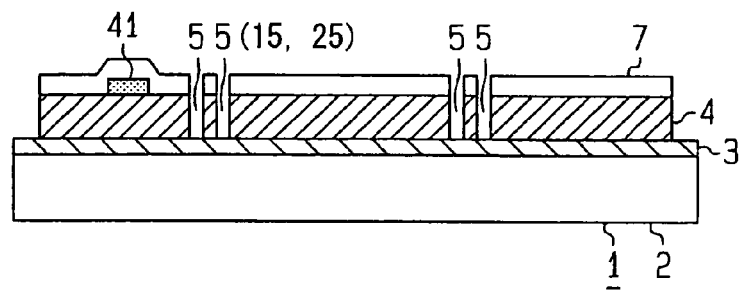
Figure 5C:
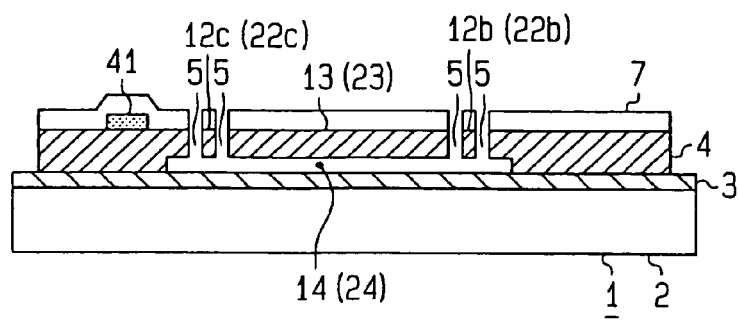

Referring to FIGS. 5A–5C, a process of manufacturing the acceleration sensor chip will be briefly described. Plural sensor chips are formed on a wafer, and the the wafer is cut into individual sensor chips. As shown in FIG. 5A, the SOI substrate 1 in a wafer-form is prepared. The SOI substrate 1 is composed of the base substrate 2 (monocrystalline silicon), the insulation layer 3 (silicon oxide) and the thin semiconductor layer 4 (monocrystalline silicon), all the layers being laminated in this order from the bottom. The terminal pad 41 is formed on the thin semiconductor layer 4 using photolithography and etching technology.

Then, as shown in FIG. 5B, the through-ditch 5 and through-holes 15, 25, both reaching the insulation layer 3 from the top surface, are formed in the following manner. The surface of the thin semiconductor layer 4 is covered with a photo-mask film 7. Then, the photo-mask film 7 is patterned, and then the through-ditch 5 and the through-holes 15, 25 are formed in the thin semiconductor layer 4 by anisotropic dry etching. Then, as shown in FIG. 5C, the air gaps 14, 24 are formed by removing part of the thin semiconductor layer 4 by performing isotropic dry etching form the top surface. By making the air gaps 14, 24, the movable electrodes 13, 23, and the beams 12a–12d, 22a–22d are separated from the insulation layer 3 and become movable relative thereto. Then, the wafer is cut into individual acceleration sensor chips.

The movable electrodes 13, 23 moves in the direction perpendicular to the surface of the sensor chip when acceleration force including a component in that direction is applied to the movable electrodes 13, 23. The amount of movement is determined by the weight of the movable electrodes and the resiliency of the beams 12a–12d, 22a–22d. According to the movement of the movable electrodes 13, 23, the first capacitance C1 formed between the movable electrode 13 and the base substrate 2 changes and the second capacitor C2 formed between the movable electrode 23 and the base substrate 2 changes as well. Since the potential of the base substrate 2 is floating as shown in FIG. 4, a capacitance difference between C1 and C2 appears on the base substrate 2. Both capacitors are made to have the same capacitance (C1=C2) when no acceleration is imposed.

Figure 6:
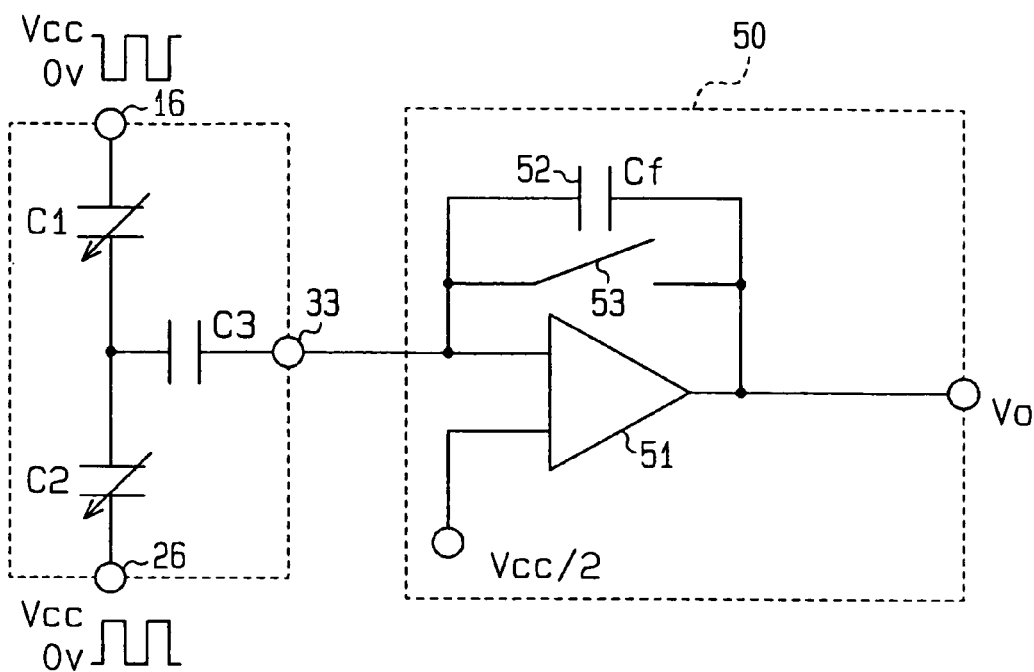
FIG. 6 is a circuit diagram showing the acceleration sensor and a switched capacitor circuit.
Figure 7:
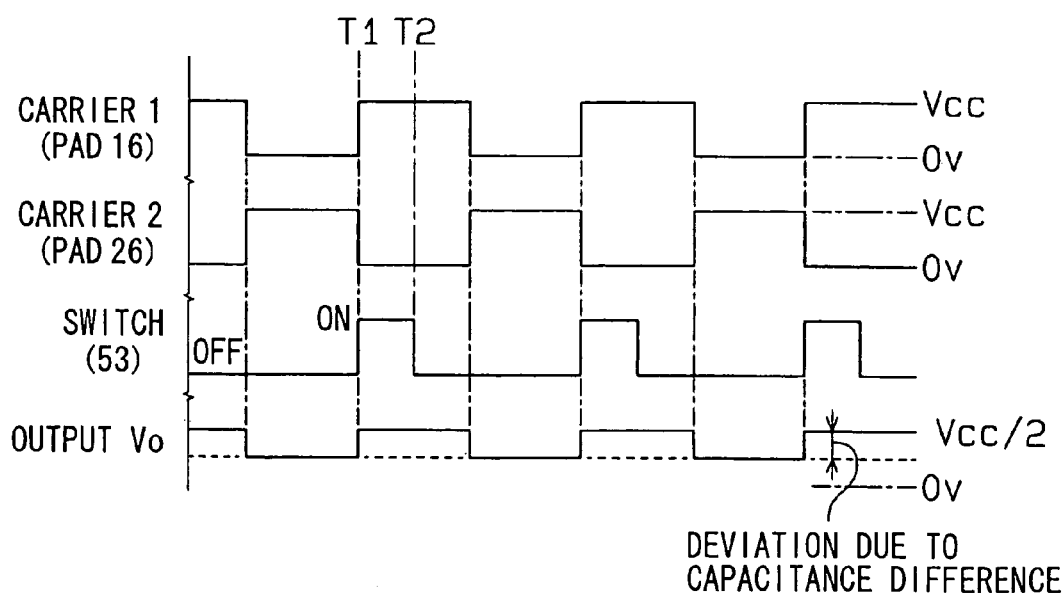
FIG. 7 is a graph showing various waveforms in a circuit for detecting acceleration.

Now, referring to FIGS. 6 and 7, how a signal representing the capacitor difference (C1−C2) is taken out will be described. FIG. 6 shows a circuit for detecting the capacitance change (C-V converter circuit), in which the acceleration sensor is shown by an equivalent circuit. FIG. 7 shows various waveforms in the detecting circuit.

As shown in FIG. 7, a first carrier voltage (e.g., 100 kHz, rectangular wave) is supplied to the terminal pad 16 of the first capacitor, and a second carrier voltage (e.g. 100 kHz, rectangular wave having a phase 180-degree inversed from the first carrier voltage) is supplied to the terminal pad 26 of the second capacitor. Both of the first carrier voltage level and the second carrier voltage level are the same, for example, 5 volts (Vcc=5 volts) . Both carrier voltages are generated in the same oscillator (not shown) in synchronism with a clock signal. The first capacitance C1 and the second capacitance C2 change according to acceleration force, while the respective carrier voltages are being applied to the first capacitor and the second capacitor. Since both capacitors are so made that their capacitances change differently form each other, a signal representing the capacitance difference (C1−C2) appears in the base substrate 2.

As shown in FIG. 6, a switched capacitor circuit 50 is connected to the terminal pad 33 of the third capacitor (composed of the output electrode 30 and the base substrate 2). The switched capacitor circuit 50 is formed on a chip separate from the acceleration sensor chip. A signal representing the capacitance difference (C1−C2) is taken out from the terminal pad 33 and fed to the switched capacitor circuit 50. The switched capacitor circuit 50 is composed of an operational amplifier 51, a switch 53 and feedback capacitor 52 having a feedback capacitance Cf, connected as shown in FIG. 6. The signal representing the capacitance difference is fed to the inversion input terminal of the operational amplifier 51 and a voltage of Vcc/2 (e.g., 2.5 volts) is supplied to a non-inversion input terminal. The switch 53 is turned on and off by a trigger signal generated in synchronism with the clock signal. As shown in FIG. 7, the switch 53 is turned on at time T1 when the first carrier voltage rises and turned off at time T2. The period in which the switch 53 is kept turned on is set to a period which is shorter than half a cycle of the first carrier voltage.

The detecting circuit 50 operates in the following manner. When the first capacitance C1 and the second capacitance C2 are the same (when no acceleration is imposed), Vcc (e.g., 5 volts) is imposed on the movable electrode 13 and zero volt is imposed on the movable electrode 23 at time T1 (refer to FIG. 7). Since the switch 53 is turned on at time T1, an output voltage Vo from the switched capacitor circuit 50 is Vcc/2. When the switch 53 is turned off at time T2, the output voltage Vo is kept unchanged at Vcc/2, because the voltages imposed on the movable electrodes 13, 23 are kept unchanged. The voltages imposed on the movable electrodes 13, 23 change according to the polarities of the carrier voltages. When the capacitance difference (C1−C2) appears according to the acceleration force, the output voltage Vo changes accordingly. The amount of acceleration is detected based on the output voltage Vo.

More particularly, the output voltage Vo is expressed in the following formula: $Vo = \{C3 \cdot (C1-C2) \cdot Vcc / (C1+C2+C3)\}/Cf$, where Cf is a feedback capacitance of the switched capacitor circuit. If C1 and C2 are sufficiently smaller than C3, the output voltage is: Vo=(C1−C2)·Vcc/Cf. Therefore, the output voltage Vo is proportional to the capacitance difference (C1−C2). In other words, the output voltage Vo representing the capacitance difference between the first capacitor and the second capacitor is taken out through the third capacitor.

The following advantages are attained in the acceleration sensor described above. The capacitance C2 of the second capacitor changes more than the capacitance C1 of the first capacitor in response to the same acceleration imposed on both capacitors because the beam length L2 is longer than the beam length L1. Accordingly, an amount of acceleration is detected based on the signal representing the capacitance difference (C1−C2). Noises disturbing the sensor output are canceled out in both capacitors, and therefore the amount of acceleration is accurately detected.

Figure 22:
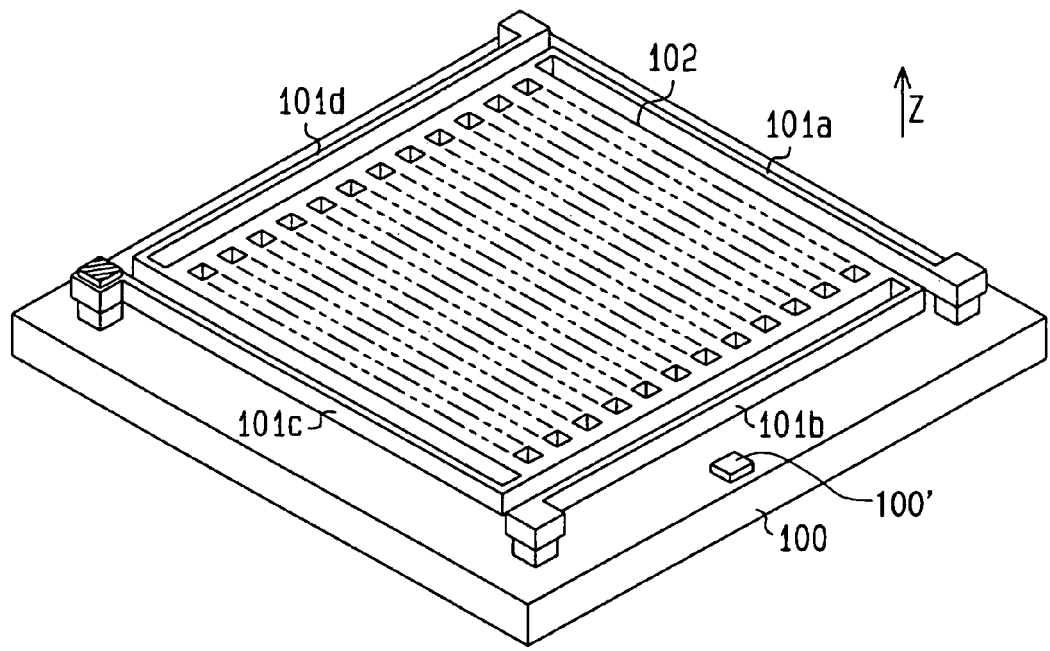
FIG. 22 is a perspective view showing an example of a conventional acceleration sensor.
Figure 23:
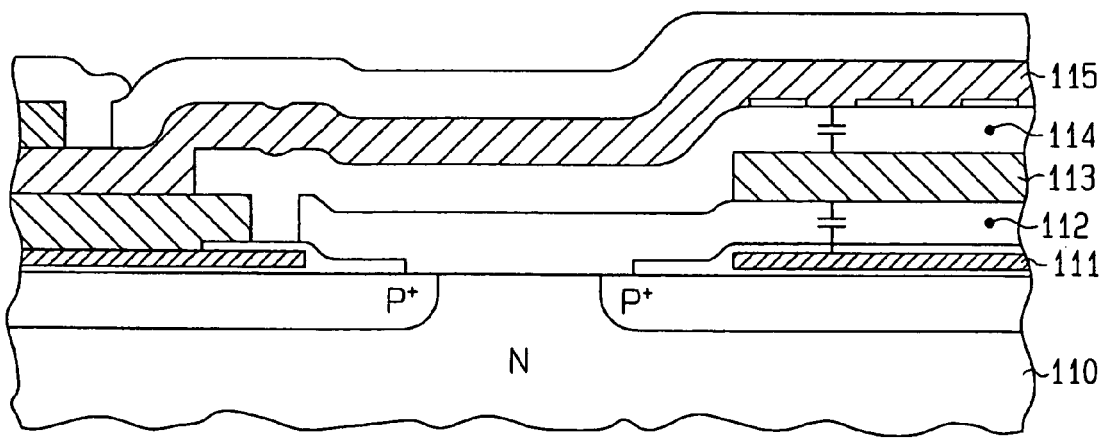
FIG. 23 is a cross-sectional view showing another example of a conventional acceleration sensor.

The acceleration sensor is formed on the SOI substrate 1 by separating its thin semiconductor layer 4 into three capacitor regions E1, E2 and E3. Therefore, manufacturing process is much simplified compared with the conventional process where three layers of poly-silicon are stacked as shown in FIG. 23. The output electrode 30 is formed on the thin semiconductor layer 4, and the output signal Vo is taken out from the terminal pad 33 formed on the output electrode 30. All the electrical connections are made solely on the upper surface (on the thin semiconductor layer 4) without using a terminal pad formed on the base substrate 2. Therefore, electrical connections are made much easier compared with the conventional sensor (FIG. 22) where the terminal pad 100' for taking out the output is formed on the base substrate 100.

Figure 8A:
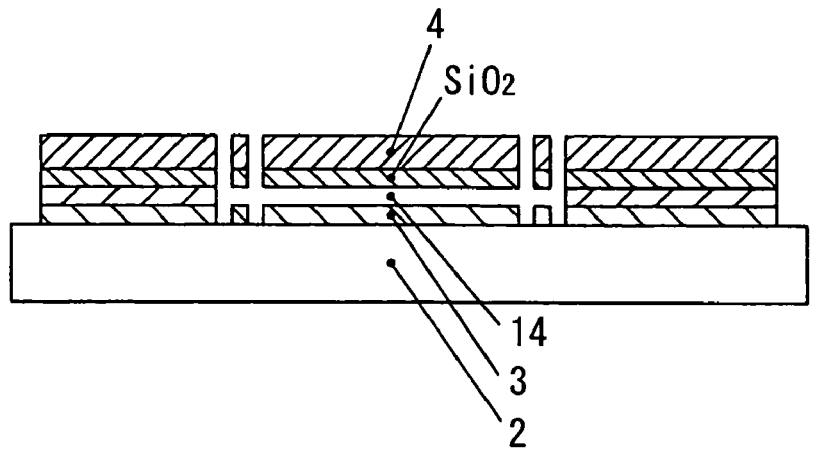
FIGS. 8A–8C are cross-sectional views showing modified forms of the acceleration sensor shown in FIG. 1.
Figure 8B:
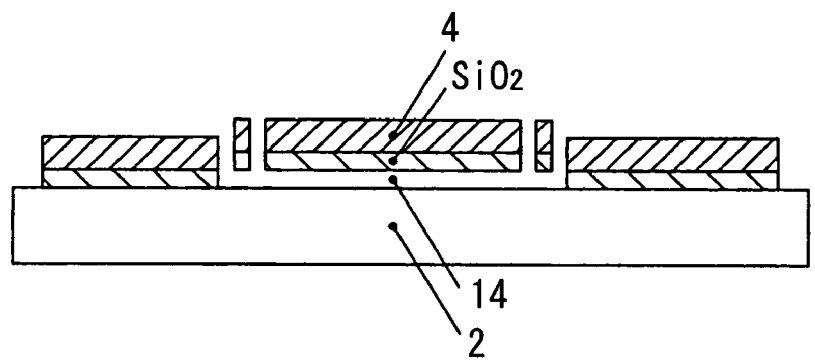
Figure 8C:
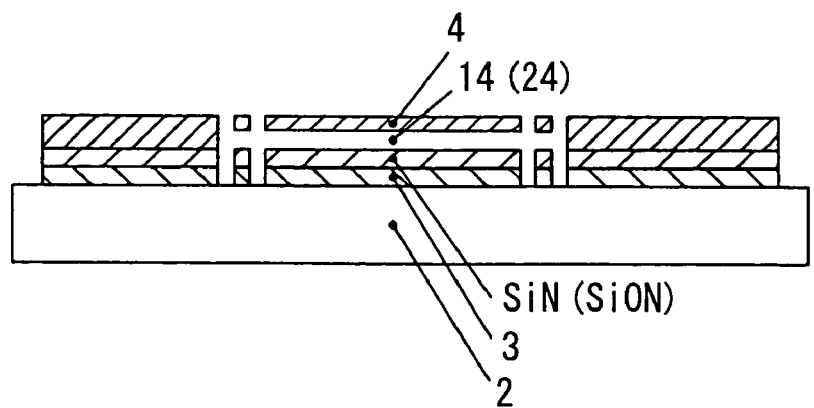

In the first embodiment described above, the capacitor having the movable electrode 13 (or 23) is constituted by four layers, as shown in FIG. 3, i.e., the base substrate 2, the insulation layer 3, the air gap 14 and the thin semiconductor layer 4. This laminating structure may be modified as shown in FIGS. 8A, 8B and 8C. In FIG. 8A, a silicon oxide layer is additionally formed underneath the thin semiconductor layer 4. In FIG. 8B, the insulation layer 3 underneath the air gap 14 is eliminated, and instead a silicon oxide layer is attached underneath the thin semiconductor layer 4. In FIG. 8C, a silicon nitride layer is additionally formed on the insulation layer 3.

Figure 9:
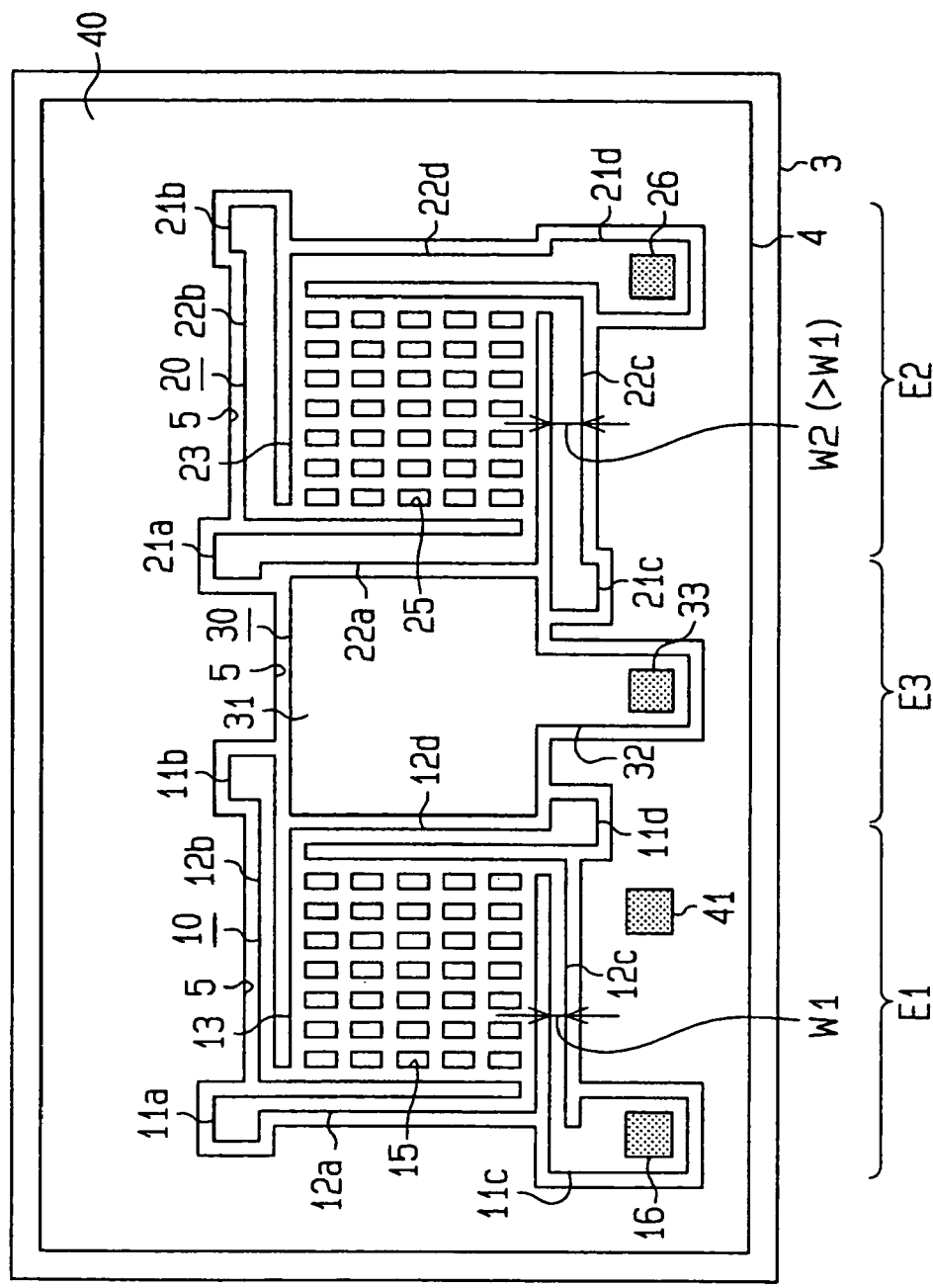
FIG. 9 is a plan view showing an acceleration sensor (similar to the first embodiment shown in FIG. 1) in which beams having different widths are formed.
Figure 10:
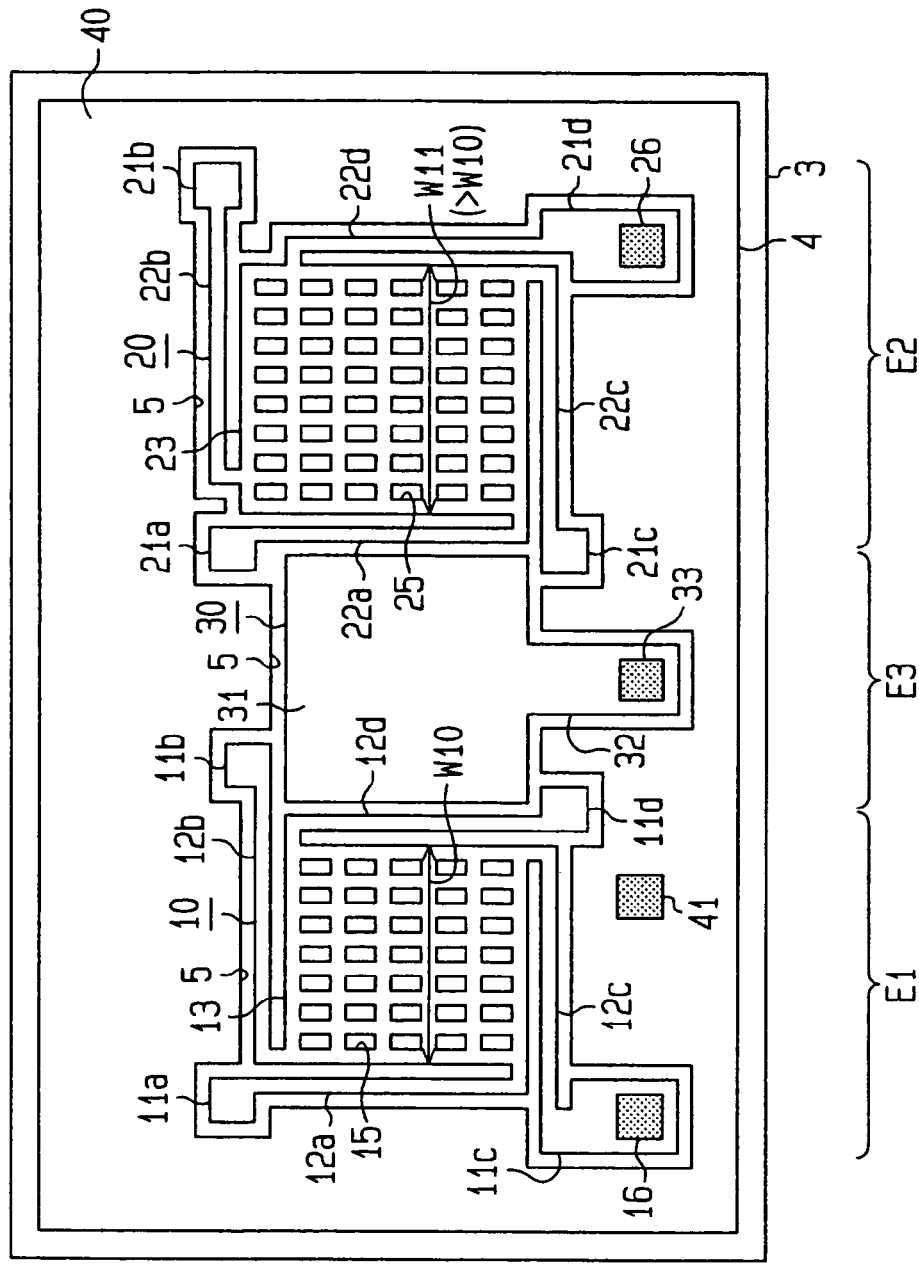
FIG. 10 is a plan view showing an acceleration sensor (similar to the first embodiment shown in FIG. 1) in which movable electrodes having different sizes are formed.
Figure 11:
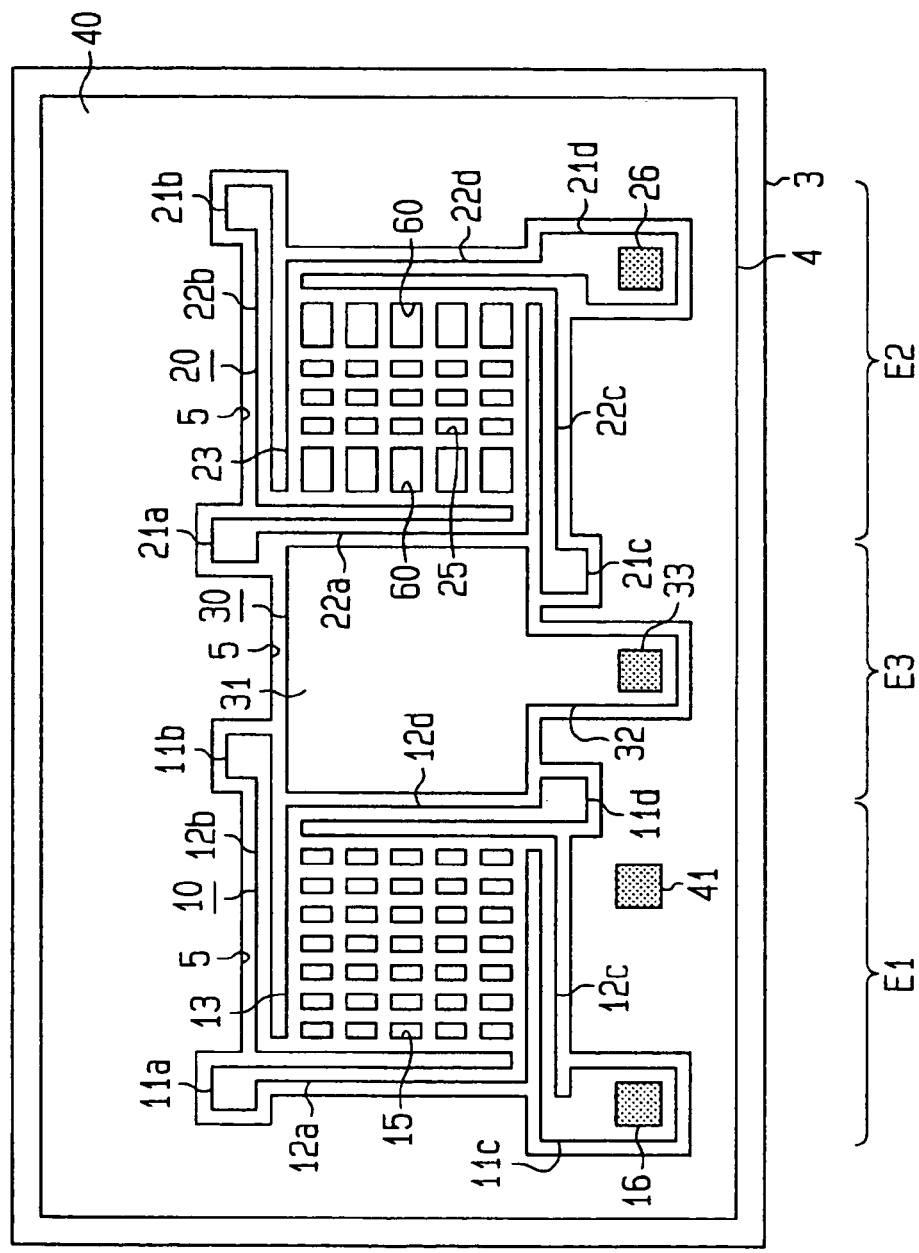
FIG. 11 is a plan view showing an acceleration sensor (similar to the first embodiment shown in FIG. 1) in which movable electrodes having differently sized through-holes are formed.

In the first embodiment described above, to obtain the capacitance difference (C1−C2) between the first capacitor and the second capacitor, the length L2 of the beams forming the second capacitor is made longer than the length L1 of the beams forming the first capacitor. The capacitance difference may be attained by various methods other than changing the beam lengths. Some examples are shown in FIGS. 9, 10, 11 and 12A–12C. In FIG. 9, the width W2 of the beams 22a–22d forming the second capacitor is made wider than the width W1 of the beams 12a–12d forming the first capacitor (W2>W1). In this manner, resiliency of the beams can be changed. In FIG. 10, the size W11 of the movable electrode 23 is made larger than the size W10 of the movable electrode 13 (W11>W10). In this manner, the mass of the movable electrodes is made different from each other. In FIG. 11, through-holes 60 having a larger opening are formed in the movable electrode 23 forming the second capacitor. In this manner, the mass or the surface area of the movable electrode 23 is made smaller than that of the movable electrode 13.

Figure 12B:
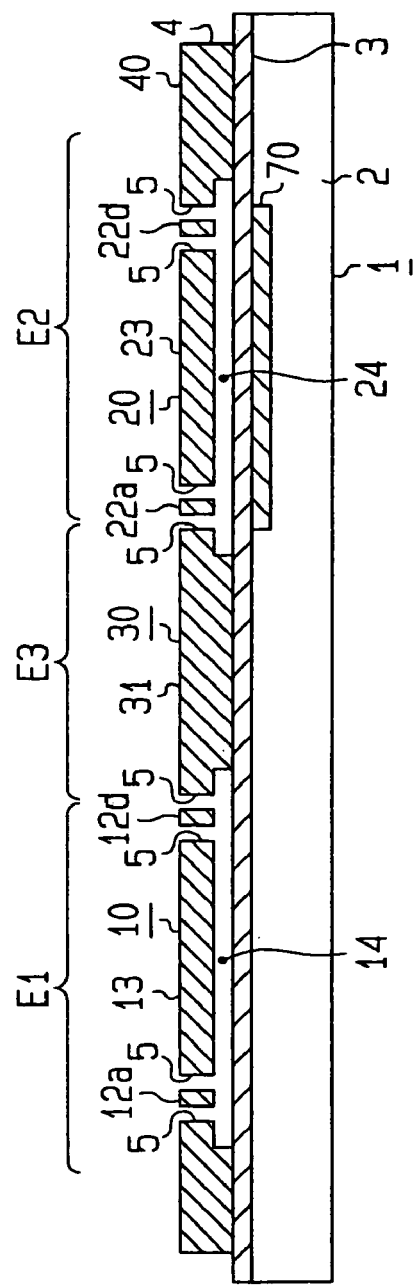
FIG. 12B is a cross-sectional view showing the acceleration sensor shown in FIG. 12A, taken along line XIIB—XIIB in FIG. 12A.
Figure 12C:
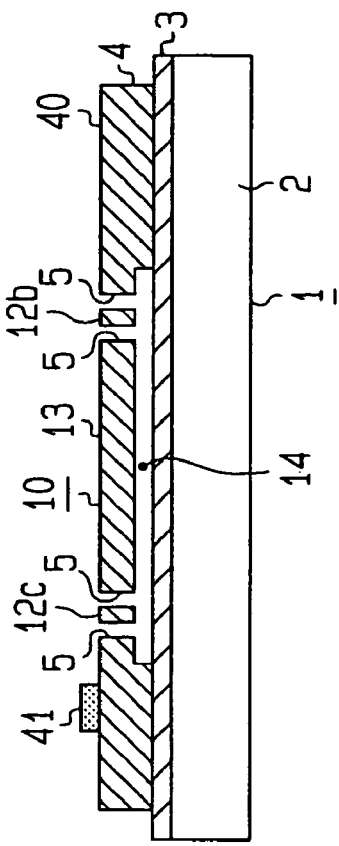
FIG. 12C is a cross-sectional view showing the acceleration sensor shown in FIG. 12A, taken along line XIIC—XIIC in FIG. 12A.

In the example shown in FIGS. 12A–12C, a silicon nitride layer 70 (as shown in FIG. 12B) is additionally formed underneath the insulation layer 3 in the second capacitor region E2. The silicon nitride layer 70 may be made of SiN or SiON. In this manner, a permittivity ($\epsilon$) of the insulator in the second capacitor can be made different from that of the first capacitor. Generally, the permittivity can be changed by changing materials or the thickness of the insulation layer in a capacitor. For example, the permittivity of the silicon dioxide is 3.9 and that of the silicon nitride is 9.0.

Figure 13:
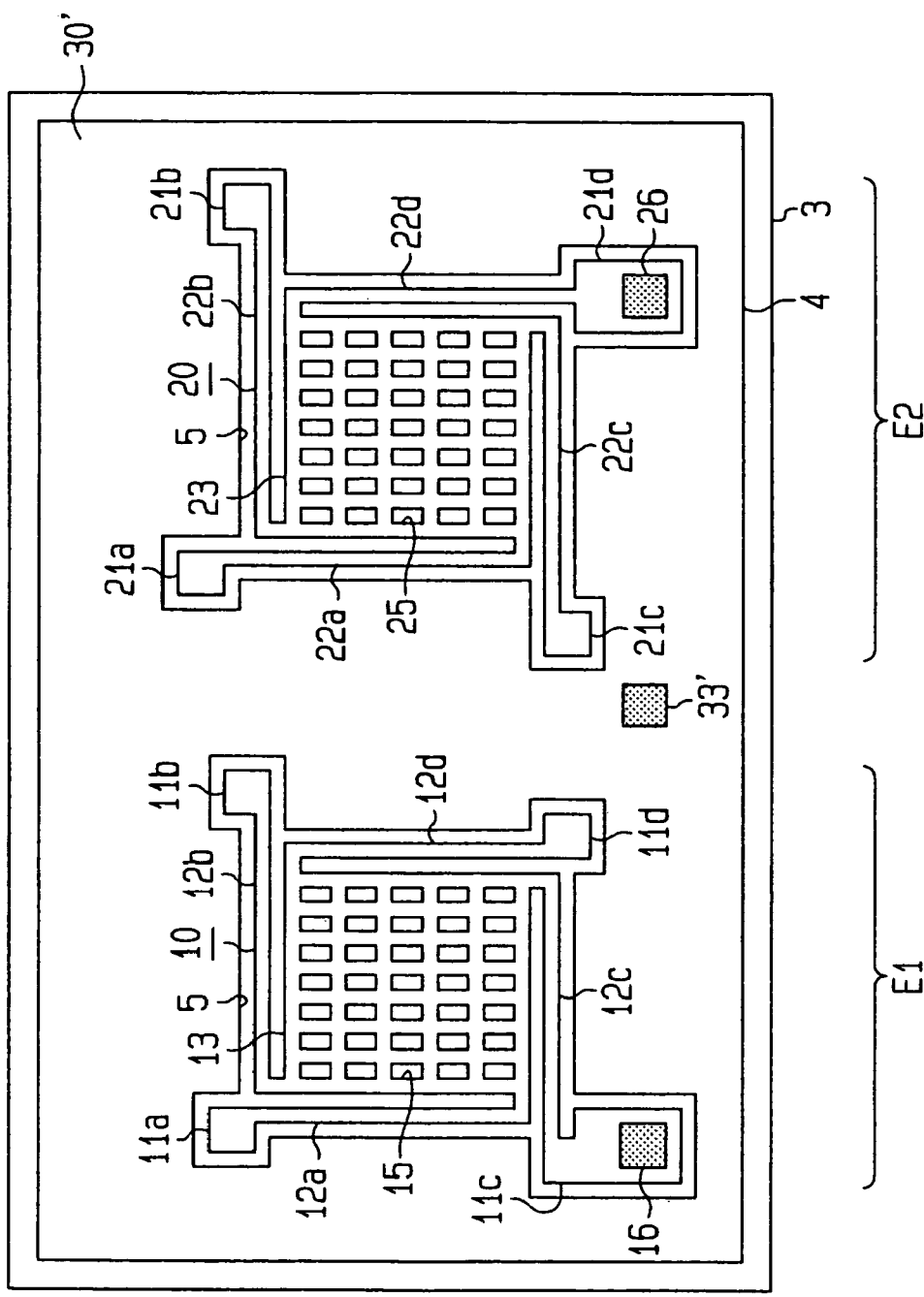
FIG. 13 is a plan view showing an acceleration sensor as a variation 1 of the first embodiment.

The first embodiment described above may be further modified to the forms shown in FIGS. 13 and 14A–14C. FIG. 13 shows a variation 1 of the first embodiment. In the variation 1, the third capacitor region E3 is eliminated and the frame portion 40 of the first embodiment is utilized as an output electrode 30'. In other words, in this variation 1, instead of forming the output electrode 30 in the third capacitor region E3, an outside region surrounding the regions E1 and E2 is utilized as the output electrode 30'. A terminal pad 33' for taking out the signal representing the capacitance difference is formed on the output electrode 30'.

Figures 14A, 14B:
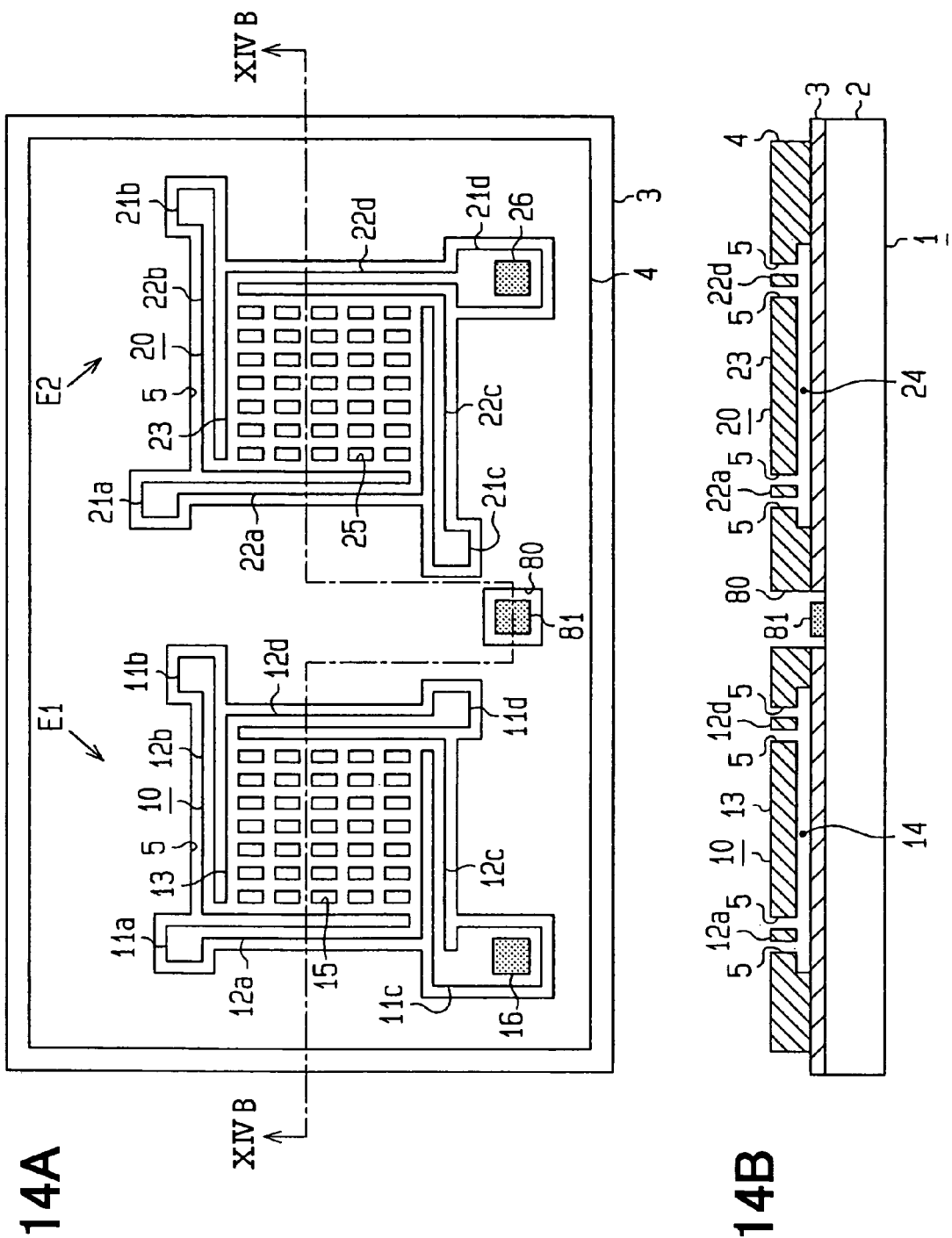
FIG. 14A is a plan view showing a variation 2 of the first embodiment.
FIG. 14B is a cross-sectional view showing the acceleration sensor shown in FIG. 14A, taken along line XIVB—XIVB in FIG. 14A.
Figure 14C:
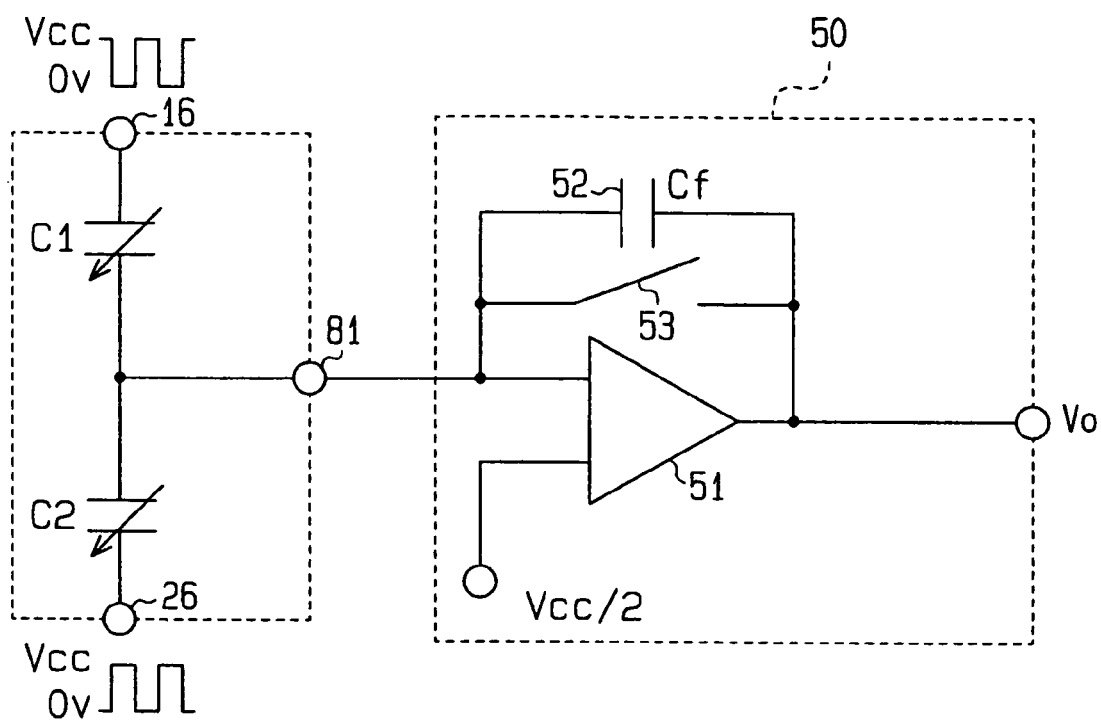
FIG. 14C is a circuit diagram showing the acceleration sensor (the variation 2) and a switched capacitor.

FIGS. 14A–14C show a variation 2 of the first embodiment. In this variation 2, the output electrode 30 formed in the third capacitor region E3 is eliminated, and a through-hole 80 extending from the top surface to the base substrate 2 is formed, as better seen in FIG. 14B. A terminal pad 81 contacting the base substrate 2 is formed, and the signal representing the capacitor difference (C1−C2) is taken out from the terminal pad 81. In other words, in this variation 2, the signal representing the capacitor difference is taken out from the base substrate 2, not from the thin semiconductor layer 4. The terminal pad 81 is electrically connected to the switched capacitor 50 as shown in FIG. 14C. The sensor output Vo in this variation 2 is expressed in the following formula:

$$Vo=(C1-C2)\cdot Vcc/Cf$$

Figure 15:
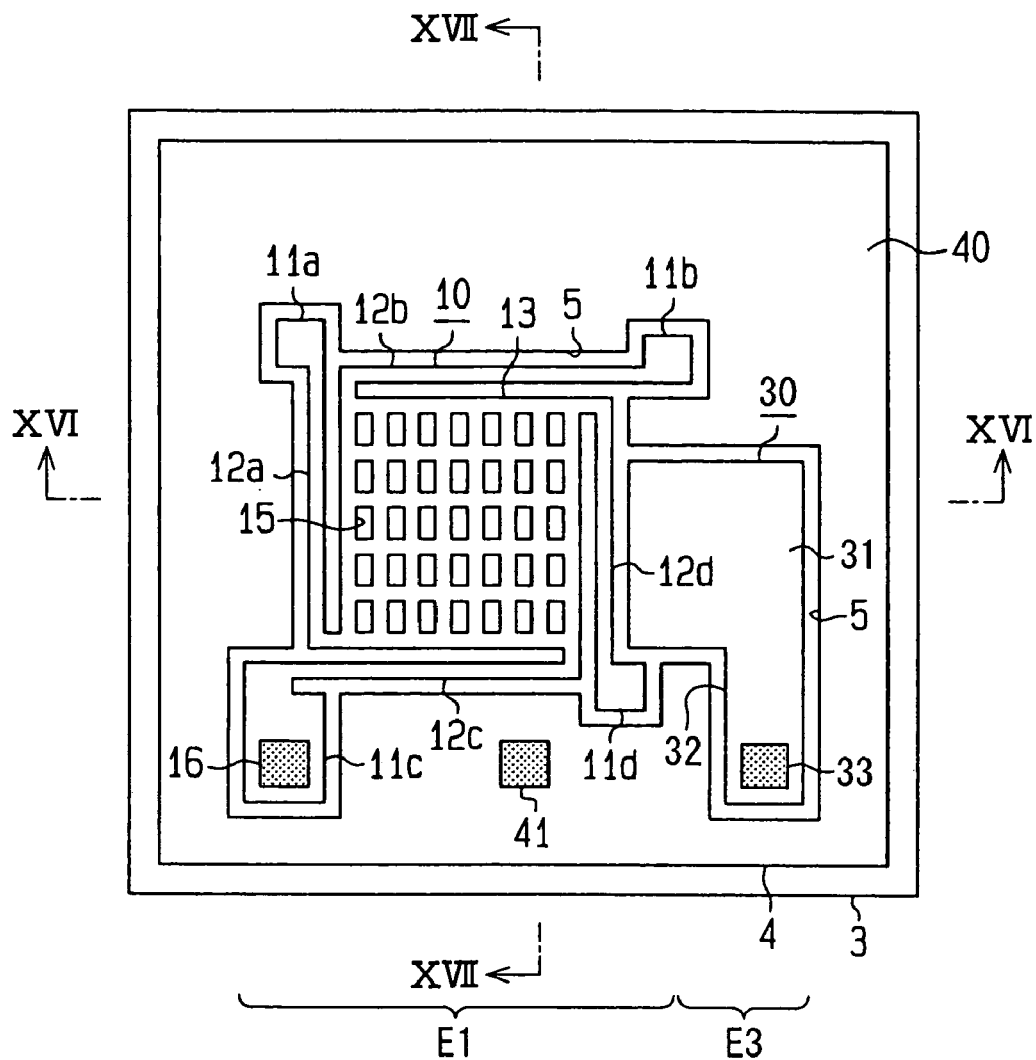
FIG. 15 is a plan view showing an acceleration sensor as a second embodiment of the present invention.
Figure 16:
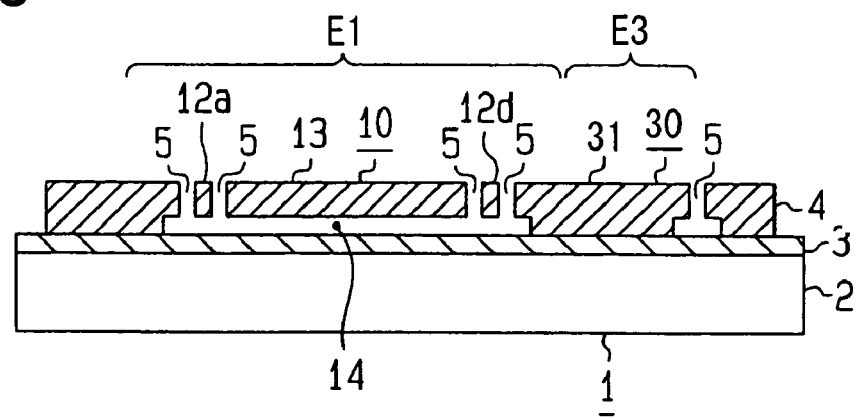
FIG. 16 is a cross-sectional view showing the acceleration sensor shown in FIG. 15, taken along line XVI—XVI in FIG. 15.
Figure 17:
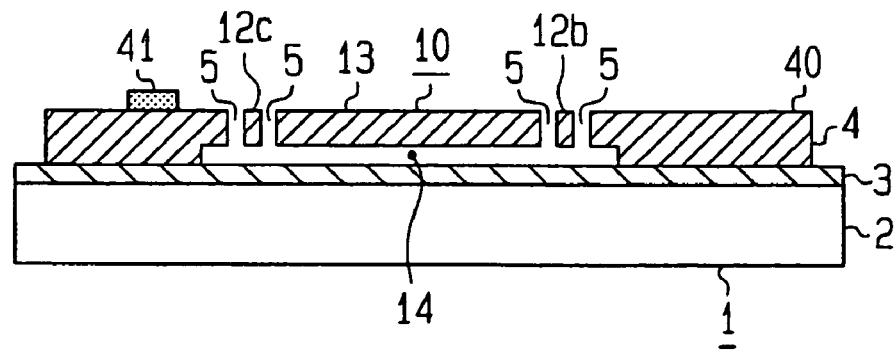
FIG. 17 is a cross-sectional view showing the acceleration sensor shown in FIG. 15, taken along line XVII—XVII in FIG. 15.

A second embodiment of the present invention will be described with reference to FIGS. 15–20. In this embodiment, the second capacitor region E2 is eliminated, compared with the first embodiment. That is, the acceleration sensor is composed of the first capacitor formed in the first capacitor region E1 and the third capacitor formed in the third capacitor region E3. Both regions E1, E3 are formed on the thin semiconductor layer 4 of the SOI substrate 1 in the same manner as those in the first embodiment. The terminal pad 41, to which a constant voltage is applied to electromagnetically shield the acceleration sensor, is formed on frame portion 40 surrounding the capacitor regions E1 and E3, in the same manner as in the first embodiment. The plan view of the acceleration sensor is shown in FIG. 15 and cross-sectional views are shown in FIGS. 16 and 17.

Figure 18:
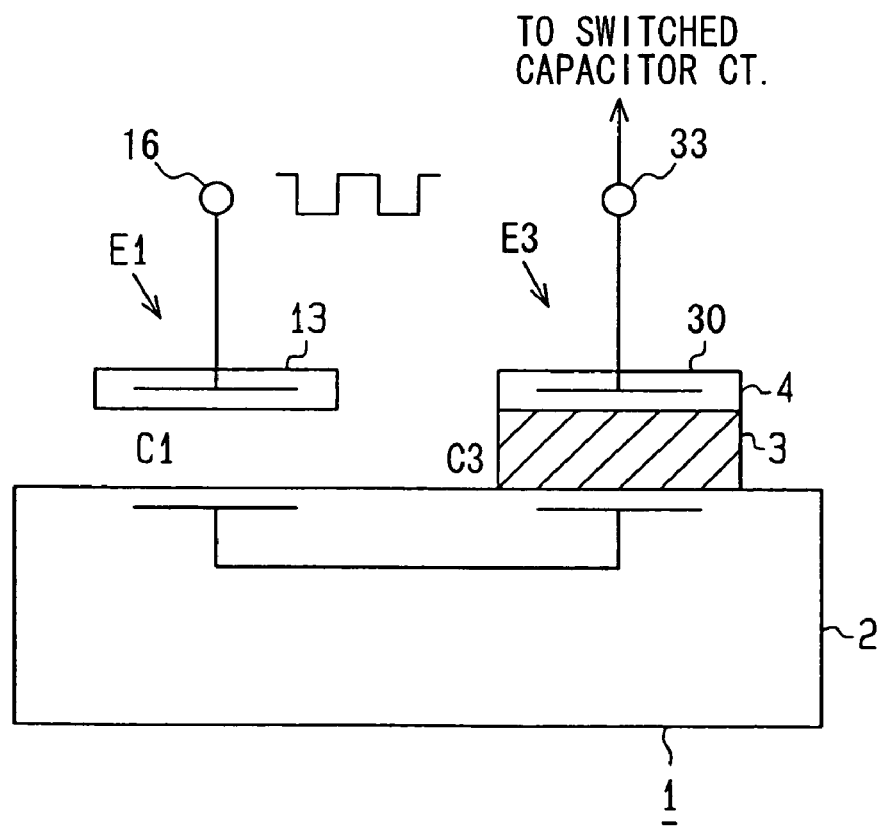
FIG. 18 is a schematic diagram showing an electrical structure in the acceleration sensor shown in FIG. 15.
Figure 19:
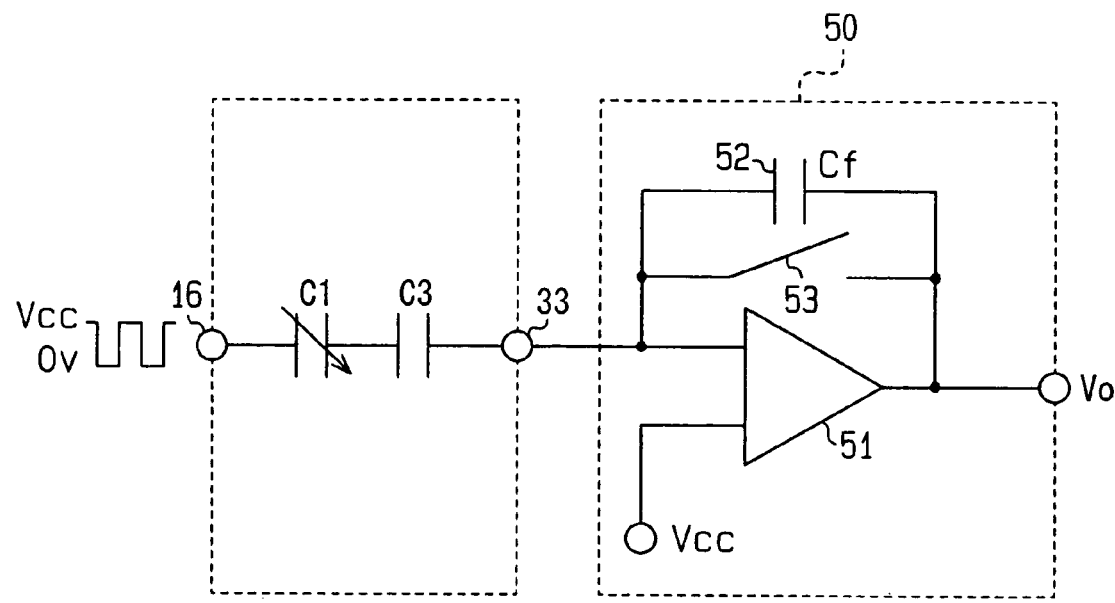
FIG. 19 is a circuit diagram showing the acceleration sensor (shown in FIG. 15) and a switched capacitor circuit.

The electrical structure in the acceleration sensor is shown in FIG. 18. The first capacitance C1 which varies in accordance with an acceleration force imposed on the movable electrode 13 is connected to the terminal pad 33 formed on the output electrode 30 via the third capacitance C3. An equivalent electric circuit for detecting the signal representing an amount of acceleration force imposed on the movable electrode 13 is shown in FIG. 19. Compared with the equivalent circuit of the first embodiment shown in FIG. 6, the second capacitance C2 is eliminated and Vcc (e.g., 5 volts) is supplied to the non-inversion input terminal of the operational amplifier 51 instead of Vcc/2 in the first embodiment. Other structures are the same as those of the first embodiment.

Figure 20:
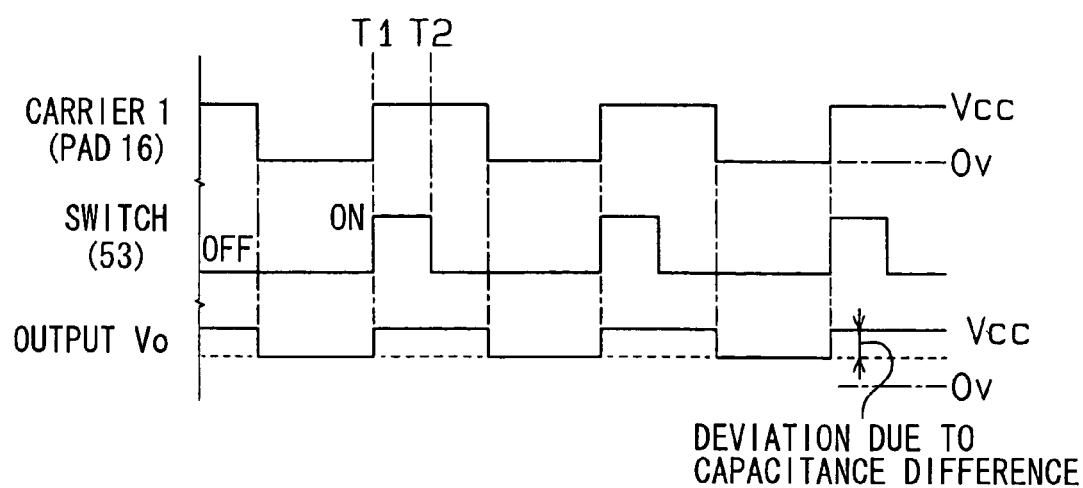
FIG. 20 is a graph showing various waveforms in a detection circuit using the second embodiment.

The signal representing the amount of acceleration force is taken out from the terminal pad 33 in the similar manner as in the first embodiment (refer to FIGS. 6 and 19). As shown in FIG. 20, the first carrier voltage having a rectangular waveform is applied to the terminal pad 16 of the first capacitor. The switch 53 is turned on at time T1 in synchronism with a rise of the first carrier voltage and turned off at time T2 during the first carrier voltage is in a high level. The output signal Vo representing the amount of acceleration force is expressed in the following formula: Vo=$\{C1 \cdot C3 \cdot Vcc/(C1+C3)\}/Cf$., where Cf is a feedback capacitance of the switched capacitor circuit 50. If C1 is sufficiently smaller than C3 (this is actually true in this embodiment), the output signal Vo can be expressed: Vo=$C1 \cdot Vcc/Cf$. This means that the output signal Vo proportional to C1 is taken out from the acceleration sensor.

The output electrode 30 having the terminal pad 33 for taking out the output is formed on the thin semiconductor layer 4 of the SOI substrate 1. Accordingly, all the electrical connection can be made on the thin semiconductor layer 4 (the top layer) while putting the base substrate 2 at a floating potential. Therefore, the electrical connection is much simplified. In addition, since the frame portion 40 to which a constant potential is given constitutes a shield layer, the acceleration sensor is protected from being disturbed by noises.

Figure 21A:
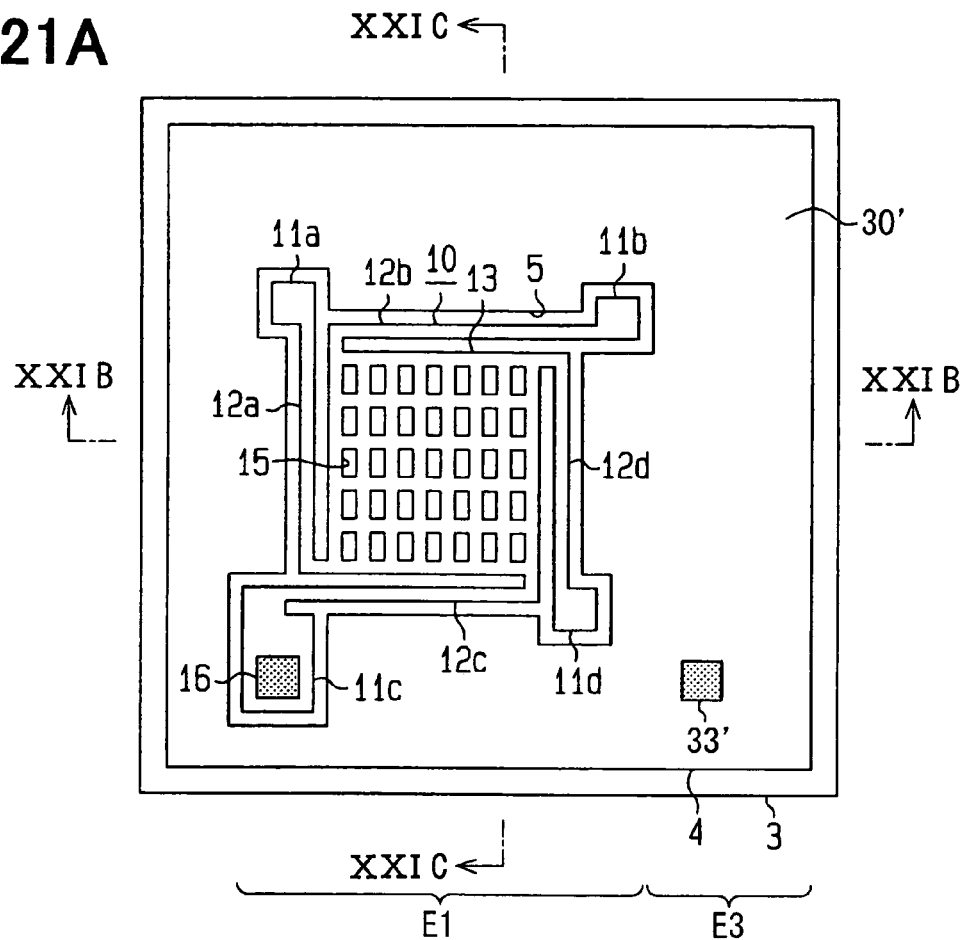
FIG. 21A is a plan view showing a variation of the second embodiment.
Figure 21B:
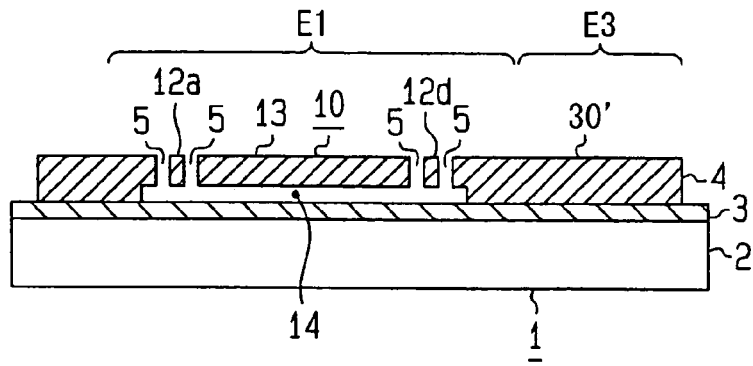
FIG. 21B is a cross-sectional view showing the acceleration sensor shown in FIG. 21A, taken along line XXIB—XXIB in FIG. 21A.
Figure 21C:
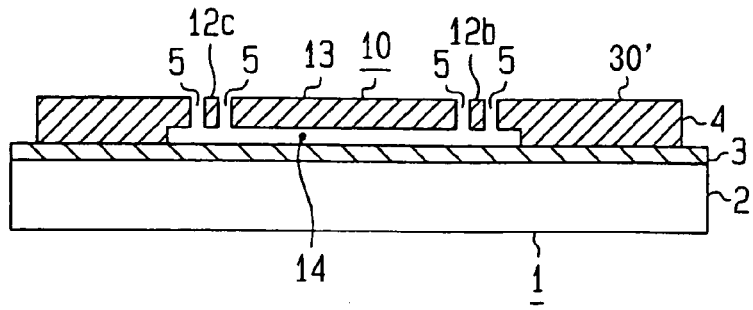
FIG. 21C is a cross-sectional view showing the acceleration sensor shown in FIG. 21A, taken along line XXIC—XXIC in FIG. 21A.

A variation of the second embodiment is shown in FIGS. 21A–21C. In this variation, the third capacitor formed in the region E3 is eliminated, and the space surrounding the first capacitor region E1 is utilized as an output electrode 30' from which the output is taken out. On the output electrode 30', a terminal pad 33' is formed, so that the inversion input terminal of the operational amplifier 51 is connected thereto. Since the terminal pad 33' is formed on the thin semiconductor layer 4, all the electrical connections of the acceleration sensor can be made on the thin semiconductor layer 4 (the top surface).

Application of this invention is not limited to the embodiments described above, but it may be applied to sensors other than the acceleration sensor, such a yaw rate sensor for use in an automobile. While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor dynamic sensor formed on a laminated substrate composed of a base substrate, an insulation layer and a thin semiconductor layer, laminated in this order, the semiconductor dynamic sensor comprising:

a first capacitor including a first beam structure formed on the thin semiconductor layer, the first beam structure having first beams and a first movable electrode supported by the first beams and facing the base substrate with an air gap therebetween, so that the first movable electrode moves in a direction perpendicular to a surface of the thin semiconductor layer when a dynamic force is imposed on the first movable electrode while a first carrier voltage is being applied thereto, a first capacitance being formed between the first movable electrode and the base substrate; and a second capacitor including a second beam structure formed on the thin semiconductor layer, the second beam structure having second beams and a second movable electrode supported by the second beams and facing the base substrate with an air gap therebetween, so that the second movable electrode moves in a direction perpendicular to the surface of the thin semiconductor layer when a dynamic force is imposed on the second movable electrode while a second carrier voltage is being applied thereto, a second capacitance being formed between the second movable electrode and the base substrate, wherein:

the first capacitance varies according to the dynamic force applied to the first movable electrode, and the second capacitance varies, in a manner different from the first capacitance, according to the dynamic force applied to the second movable electrode; and an output signal representing a capacitance difference between the first capacitance and the second capacitance is taken out from the base substrate.

2. The semiconductor dynamic sensor as in claim 1, further comprising a third capacitor having an output electrode formed on the thin semiconductor layer, the output electrode being solidly connected to the base substrate via the insulation layer, thereby forming a third capacitance between the output electrode and the base substrate, wherein:

the output signal is transmitted from the base substrate to the output electrode through the third capacitance.

3. The semiconductor dynamic sensor as in claim 1, wherein:

a length of the second beams are different from a length of the first beams, so that the second capacitance varies in a manner different from that of the first capacitance when the dynamic force is applied to the first movable electrode and the second movable electrode.

4. The semiconductor dynamic sensor as in claim 1, wherein:

a width of the second beams are different from a width of the first beams, so that the second capacitance varies in a manner different from that of the first capacitance when the dynamic force is applied to the first movable electrode and the second movable electrode.

5. The semiconductor dynamic sensor as in claim 1, wherein:

a mass or a surface area of the second movable electrode is different from a mass or a surface area of the first movable electrode, so that the second capacitance varies in a manner different from that of the first capacitance when the dynamic force is applied to the first movable electrode and the second movable electrode.

6. The semiconductor dynamic sensor as in claim 1, wherein:

a thickness or a material of the insulation layer between the first beam structure and the base substrate is different from a thickness or a material of the insulation layer between the second beam structure and the base substrate, so that the second capacitance varies in a manner different from that of the first capacitance when the dynamic force is applied to the first movable electrode and the second movable electrode.

7. The semiconductor dynamic sensor as in claim 1, wherein:

the thin semiconductor layer surrounding the first beam structure and the second beam structure is utilized as an output electrode to which the output signal is transmitted from the base substrate through a capacitor formed between the thin semiconductor layer and the base substrate.

8. The semiconductor dynamic sensor as in claim 1, wherein:

a hole reaching the base substrate from a surface of the thin semiconductor layer is formed, and a terminal pad is formed in the hole to directly contact the base substrate; and the output signal is taken out from the terminal pad contacting the base substrate.

9. The semiconductor dynamic sensor as in claim 1, wherein:
the semiconductor dynamic sensor is an acceleration sensor for detecting an amount of acceleration for use in an automotive vehicle.

10. A semiconductor dynamic sensor formed on a laminated substrate composed of a base substrate, an insulation layer and a thin semiconductor layer, laminated in this order, the semiconductor dynamic sensor comprising:
a first capacitor including a first beam structure formed on the thin semiconductor layer, the first beam structure having first beams and a first movable electrode supported by the first beams and facing the base substrate with an air gap therebetween, so that the first movable electrode moves in a direction perpendicular to a surface of the thin semiconductor layer when a dynamic force is imposed on the first movable electrode while a first carrier voltage is being applied thereto, a first capacitance being formed between the first movable electrode and the base substrate; and
a second capacitor having an output electrode formed on the thin semiconductor layer, the output electrode being solidly connected to the base substrate via the insulation layer, thereby forming a second capacitance between the output electrode and the base substrate, wherein:
an output signal representing the first capacitance that varies in accordance with the dynamic force imposed on the first movable electrode is transmitted from the base substrate to the output electrode through the second capacitance and is taken out from the output electrode.

11. The semiconductor dynamic sensor as in claim 10, wherein:
a constant voltage is supplied to a frame portion of the thin semiconductor layer surrounding the first beam structure and the output electrode, thereby utilizing the frame portion as a shield layer.

12. The semiconductor dynamic sensor as in claim 10, wherein:
the second capacitor is removed from the thin semiconductor layer, and a frame portion surrounding the first beam structure is utilized as the output electrode for taking out the output signal.

13. The semiconductor dynamic sensor as in claim 10, wherein:
the semiconductor dynamic sensor is an acceleration sensor for detecting an amount of acceleration for use in an automotive vehicle.

* * * * *